(12) United States Patent
Tain et al.

(10) Patent No.: US 7,589,797 B2
(45) Date of Patent: Sep. 15, 2009

(54) HIGH EFFICIENCY LIQUID CRYSTAL DISPLAY PROJECTION SYSTEM

(75) Inventors: Ra-Min Tain, Taipei County (TW); Chun-Chuan Lin, Hsinchu (TW); Wei-Kuo Han, Hsinchu (TW); Je-Ping Hu, Hsinchu (TW); Chen-Hung Chew, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 273 days.

(21) Appl. No.: 11/777,720

(22) Filed: Jul. 13, 2007

(65) Prior Publication Data

US 2007/0258018 A1 Nov. 8, 2007

Related U.S. Application Data

(63) Continuation-in-part of application No. 11/223,557, filed on Sep. 9, 2005, now Pat. No. 7,354,178.

(30) Foreign Application Priority Data

Jul. 25, 2005 (TW) .............................. 94125065 A
Nov. 13, 2006 (TW) .............................. 95141897 A (51) Int. Cl.
*G02F 1/1335* (2006.01)
*G03B 21/14* (2006.01)

(52) U.S. Cl. .................................. 349/5; 349/9; 353/84

(58) Field of Classification Search ...................... 349/5, 349/9, 8; 353/84
See application file for complete search history.

(56) References Cited

U.S. PATENT DOCUMENTS

| 6,203,160 | B1* | 3/2001 | Ho ............................... 353/84 |
| 7,192,147 | B2* | 3/2007 | Sakata et al. .................. 362/19 |
| 7,354,178 | B2* | 4/2008 | Han et al. .................... 362/304 |
| 2003/0231497 | A1* | 12/2003 | Sakata et al. ................ 362/341 |
| 2007/0121310 | A1* | 5/2007 | Sakata et al. .................. 362/19 |

FOREIGN PATENT DOCUMENTS

| CN | 1360218 | 7/2002 |
| CN | 1570704 | 1/2005 |
| CN | 1794039 | 6/2006 |
| JP | 2002-334607 | 11/2002 |

* cited by examiner

*Primary Examiner*—Mike Qi
(74) *Attorney, Agent, or Firm*—J.C. Patents (57) ABSTRACT

A transmitting-type liquid crystal display projection system including a planar light source which emits planar white beam or planar R/G/B beams in succession is provided. A first polarization filter receives the planar light source and polarizes the same to be in a first polarization state. A liquid-crystal light valve receives the polarized planar light source, and converts the first polarization state to a second polarization state having a corresponding gray level. A second polarization filter receives a light output from the liquid crystal light valve to produce a second polarization light beam. A projection unit projects the second polarization light beam onto a display plane. Using the same planar light source, a polarization beam splitting (PBS) device with a refection-type liquid crystal light valve can be used to achieve the reflection-type projection system.

17 Claims, 5 Drawing Sheets

HIGH EFFICIENCY LIQUID CRYSTAL DISPLAY PROJECTION SYSTEM

CROSS-REFERENCE TO RELATED APPLICATION

This application is a continuation-in-part of a prior application Ser. No. 11/223,557, filed Sep. 9, 2005, and claims the priority benefit of Taiwan application serial no. 95141897, filed on Nov. 13, 2006. The prior application Ser. No. 11/223, 557 claims the priority benefit of Taiwan application serial no. 94125065, filed on Jul. 25, 2005. The entirety of each of the above-mentioned patent applications is hereby incorporated by reference herein and made a part of this specification.

BACKGROUND OF THE INVENTION

1. Field of the Invention

The present invention relates to a projection display technology, and more particularly, to a high efficiency liquid crystal display projection system.

2. Description of Related Art

The projection liquid crystal display technology has been a usual technology. The traditional liquid crystal display projection system mainly uses the reflective liquid crystal on silicon (LCOS) panel to process the colors and the gray levels of the image pixels. One of the main characteristics of the so-called reflective LCOS panel is that most of the driving devices are formed on the lower substrate while the liquid crystal layer is formed between the upper and the lower substrates. The light source enters the lower substrate from the upper substrate and the light is then reflected from the reflective layer of the lower substrate. Therefore, the reflected light will not be blocked by the driving devices and the utility efficiency of lights can be improved.

Figure 1:
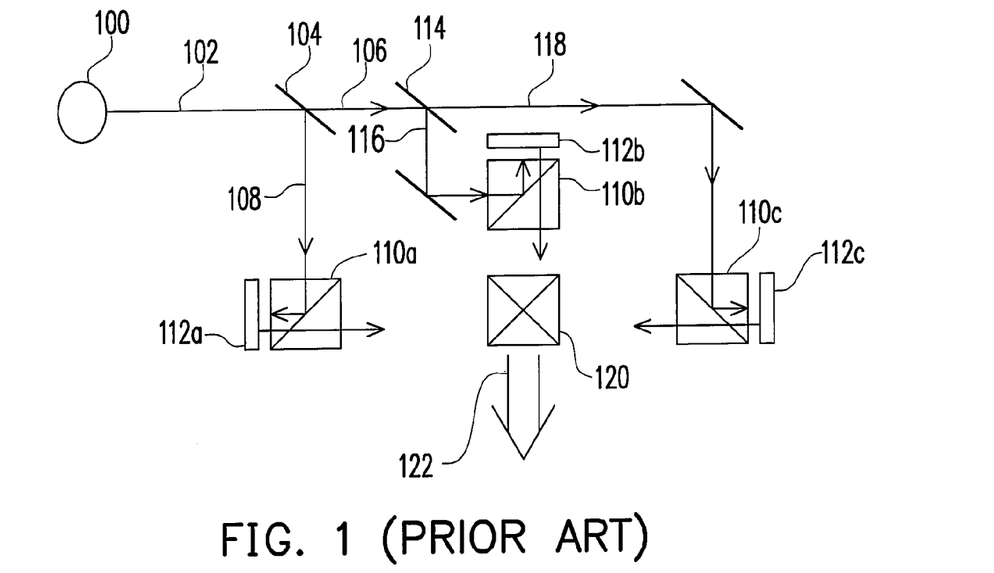
FIG. 1 shows a schematic view that illustrates a traditional liquid crystal display projection system.

FIG. 1 shows a traditional liquid crystal display system. In FIG. 11, a light source 100 emits a white beam 102. The white beam 102 enters a dichroic mirror 104 to be split into a blue beam 108 and a red/green (R/G) mixing beam 106. The R/G mixing beam 106 is then incident to another dichroic mirror to be split into a red beam 116 and a green beam 118. The light path and the mechanism of the blue beam 108 is first described. The non-polarized blue beam 108 comprises P-polarization and S-polarization. Then, the blue beam 108 enters a polarized beam splitter (PBS) device 110a. The functions of the PBS device include reflecting S-polarized light but allowing P-polarized light to penetrate through. Accordingly, the PBS device 110a will reflect the S-polarized light of the blue beam 108, which then enters the reflective LCOS panel 112a. The reflective LCOS panel 112a contains a pixel region. Through controlling the liquid crystal molecule rotation of the corresponding pixels, the S-polarized blue light will tilt to produce a new polarization state, comprising partial S-polarization and partial P-polarization. The amount of P-polarization varies according to the desired gray level, generating a gray level of colors in cooperation with the PBS device 110a.

The blue light that is reflected back to the PBS device 110a by the reflective LCOS panel 112a contains P-polarization based on the requirement of the image pixel. This P-polarized blue light can penetrate through the PBS device 110a to be incident to a color-combination prism 120. The amount of P-polarization is determined by the blue light gray level required by the image. If blue light is not required, the value of the P-polarization will be zero. Hence, no blue light will penetrate through the PBS device 110a. As a result, the value of the P-polarization increases when the blue light gray level increases.

Based on the same mechanism, the red beam 116 is reflected by a reflective mirror and enters the PBS device 110b and then gets reflected to the PBS device 110b by the LCOS panel 112b, wherein the P-polarized red light will enter the color-combination prism 120.

Similarly, the green beam 118 is reflected by a reflective mirror and enters a PBS device 110c and then gets reflected to the PBS device 110c by the LCOS panel 112c, wherein the P-polarized green light will enter the color-combination prism 120.

The color-combination prism 120 receives the image lights of three colors to form an image 122. This image 122 can be projected to a screen. This type of liquid crystal display projection system processes the three primary colors, (red/green/blue, R/G/B), respectively, hence, it is bigger in volume with a higher manufacturing cost and a poorer utility efficiency of lights.

Figure 2:
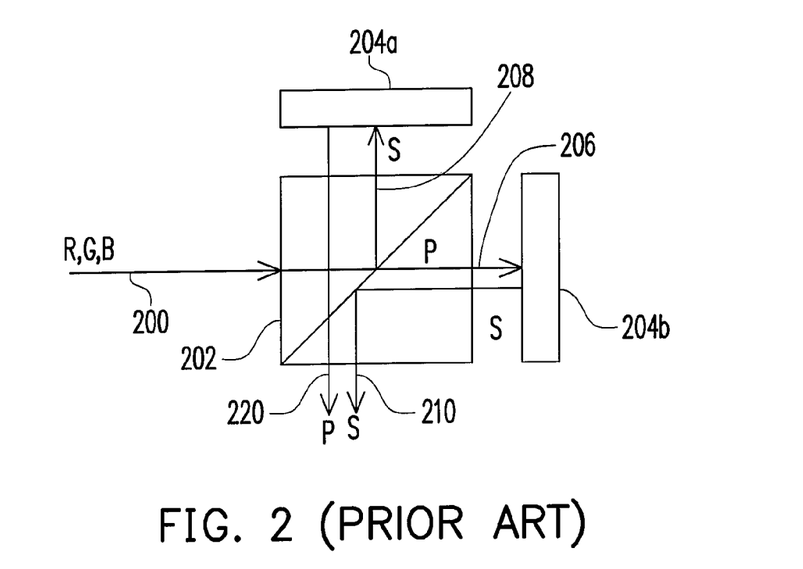
FIG. 2 shows a schematic view that illustrates a traditional dual-panel liquid crystal display projection system.

FIG. 2 shows a traditional dual-panel liquid crystal display projection system. In FIG. 2, the light source 200 of R/G/B lights emits light through a PBS device 202 in succession. Since human eyes experience a phenomenon known as visual retention, therefore, when the light emitted by the light source 200 of R/G/B lights enters the human eyes within the range of visual retention, the overlap of R/G/B lights results in what is perceived as colors by the human eyes.

As a result, the projection system shown in FIG. 2 requires only one PBS device 202, but two LCOS panels, namely 204a and 204b. For instance, after the light source 200 of R/G/B emits lights through the PBS device 202, the P-polarized red light 206 will penetrate through the PBS device 202 to be reflected by the LCOS panel 204b and the polarization varies according to the requirement of the gray level, which might be converted to S-polarization. Subsequently, the reflected PBS device 202 will reflect out a red beam 210. The generation mechanisms for green light and blue light are the same as the aforementioned, which will not be described again. In addition, the PBS device 202 also reflects a S-polarized red light 208, which enters the LCOS panel 204a to be converted to a P-polarized red light 220. This P-polarized red light 220 and the S-polarized red light 210 form one red light image. Since there are two LCOS panels, namely 204, the utility efficiency of lights is increased. Moreover, only one PBS device, namely 202, is needed because the light source of R/G/B lights emits light in succession.

Furthermore, the light-emitting surface of the traditionally used light source gives off uneven brightness. Thus, the choice of the light source affects the illumination of display.

Although different designs of liquid crystal projection system have been developed based on the traditional technology, there is still room for further research and development.

SUMMARY OF THE INVENTION

The present invention provides a liquid crystal projection system comprising a more uniform planar light source.

The present invention provides a liquid crystal projection system that uses a transmitting-type LCOS panel to produce three primary color lights either through the direct employment of the three primary color filter or following a time sequence.

The present invention provides a liquid crystal projection system, including a planar light source. This planar light source includes a plurality of light-emitting units arranged in an array. Each light-emitting unit comprises a conoid-like reflective surface, wherein an edge of a light outputting surface of a conoid-like reflective surface and that of the adjacent conoid-like reflective surface are conformal. A plurality of light emitting devices controls the light emission of a planar light source. Wherein, the planar light source emits either a white beam or cyclically R/G/B beams in succession. A first polarization filter receives the planar light source and polarizes the planar light to a first polarization light beam in a first polarization state. A transmitting-type liquid crystal light valve receives the first polarization light beam for converting the first polarization state based on a gray level to produce a second polarization state having the corresponding gray level. A second polarization filter receives a light output from the liquid crystal light valve to produce a second polarization light beam in a second polarization state. A projection unit projects the second polarization light beam onto a display plane.

The present invention provides a liquid crystal display projection system, including a planar light source and a plurality of light-emitting units arranged in an array. Each light-emitting unit comprises a conoid-like reflective surface, wherein an edge of a light outputting surface of a conoid-like reflective surface and that of the adjacent conoid-like reflective surface are conformal. A plurality of light emitting devices controls the light emission of a planar light source. The planar light source emits either a white beam or cyclically RIG/B beams in succession. A PBS device receives the planar light source, allowing a first light beam in a first polarization state to penetrate through and reflecting a second light beam in a second polarization state. A reflective first liquid crystal light valve receives either the first light beam or the second light beam to serve as a third light beam, and reflects a first reflection light back to the PBS device. The first liquid crystal light valve converts the third light beam in a polarization state into the first reflection light in a first reflective polarization state according to the requirement of gray level. Then, the PBS device splits a first image light from the first reflective polarization state. A projection unit projects the first image light onto a display plane.

In order to the make the aforementioned and other objects, features and advantages of the present invention comprehensible, a preferred embodiment accompanied with figures are described in detail below.

DESCRIPTION OF EMBODIMENTS

First, the present invention provides an improved and innovative design of the light source used in the liquid crystal display projection system, which comprises a more uniform planar light source that allows better utility efficiency of lights and provides a more uniform image brightness. It will be illustrated through the following embodiments, and the present invention is not limited to the recited embodiments.

Figure 3:
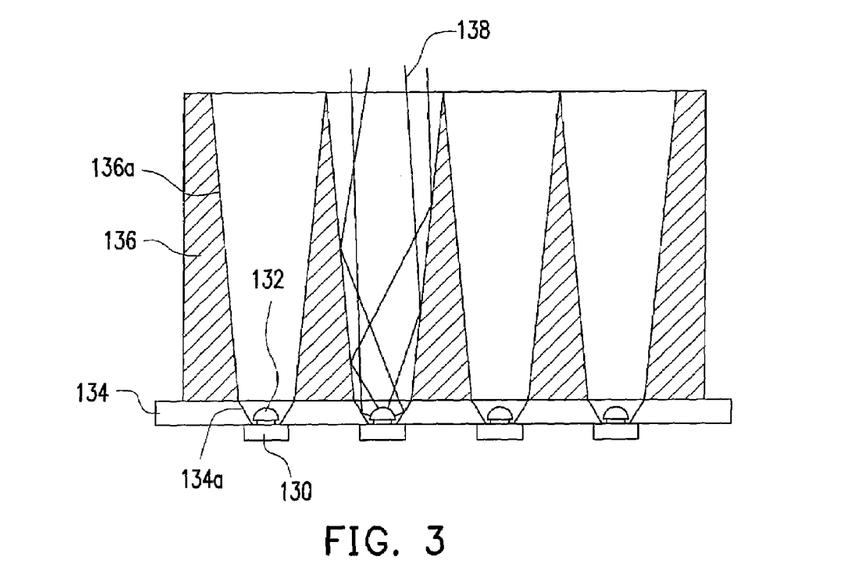
FIG. 3 is a cross-sectional view, schematically illustrating a structure of an illuminating light source, according to an embodiment of the present invention.
Figure 4:
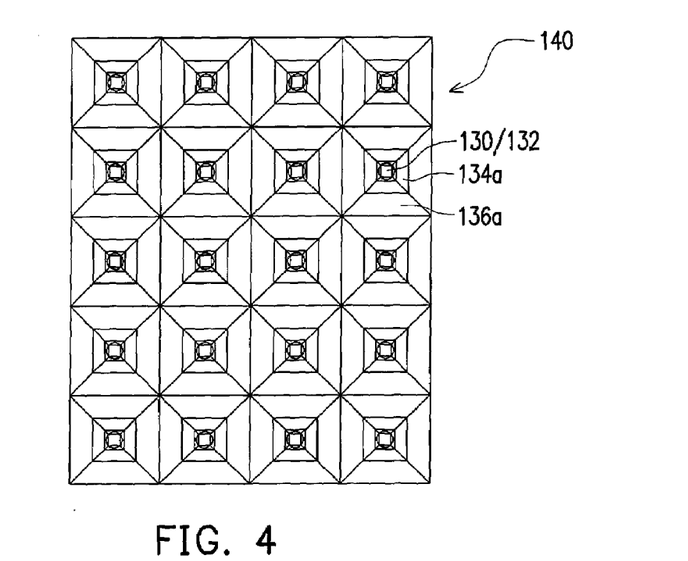
FIG. 4 is a top view, schematically illustrating a top view of the structure of the light source corresponding to FIG. 3.

FIG. 3 is a cross-sectional view, schematically illustrating a structure of an illuminating light source, according to an embodiment of the present invention. FIG. 4 is a top view, schematically illustrating a top view of the structure of the light source corresponding to FIG. 3. In FIG. 3 and FIG. 4, the array of the illuminating light source can include, for example, four illuminating units on one side. An illuminating unit includes a point-like light emitting device, such as an LED having a substrate electrode part 130 and a packaged light emitting part 132. The point-like light emitting device radially emits light within a range of a solid angle from a center point.

This point-like light emitting device is structured based on a light emitting diode (LED) that gives off white beam. However, the point-like light emitting device can also be structured according to three LED's that respectively give off R/G/B beams to provide a variety of the desired effects.

Figure 5:
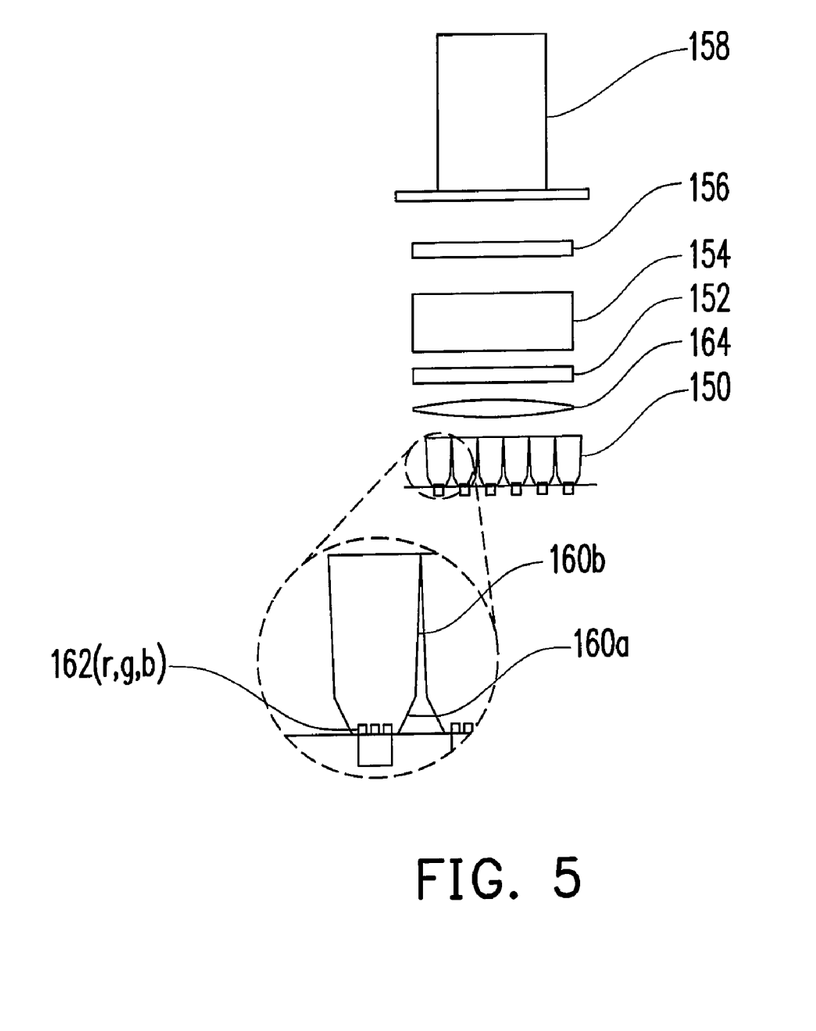
FIG. 5 shows a schematic view that illustrates the structure of a transmitting-type liquid crystal display projection system, according to an embodiment of the present invention.

Wherein, the point-like light emitting device based on the LED that gives off R/G/B beams demonstrates a more desirable performance (See FIG. 5). It is because each individual color light in the R/G/B emitting LED has a different frequency. As a result, interferences are minimized to achieve a better gamut.

The primary projection direction of the light emitted from the point-like light emitting device is defined as an optical axis. At the periphery of the point-like light-emitting device, according to the embodiment in the present invention such as shown in FIG. 3 and FIG. 4, two-stage reflective surfaces 134a and 136a are installed. Due to the arrangement of the angles for the two-stage reflective surfaces 134a and 136a, a large portion of the light emitted from the point-like light-emitting device travels along the optical path 138 to be reflected by the reflective surfaces 134a and 136a once or multiple times, forming a collimating beam along the optical axis. Further, the light is well-mixed as a result of the single or multiple reflections. Additionally, the conoid-like reflective surface can be arranged in three or more stages according to the description of design above when needed.

For the two-stage conoid-like reflective surfaces 134a and 136a, each stage can form, for example, a four-plane pyramid having a convergent opening end and a divergent opening end. Wherein, the point-like light emitting device is located at the convergent opening end and the optical axis is directed towards the divergent opening end to allow light emission. Generally, the conoid planes can be formed by multiple pyramid planes. A desirable form would be in a case where the shape of the cross-section is a square or a rectangle. To have a good fit, the cross-sectional shape of the conoid planes can also be triangular or polygonal. Nonetheless, when a good fit is not required, the conoid planes can be circles, ovals or smooth curves. Some modified examples are to be described later.

The present invention is designed in conformity with square LED crystalline grains, forming a plurality of four-face pyramid-like reflective surfaces. For instance, the reflective mirror collimates lateral lights through multiple reflections and ensures uniform mixing of lights. As a result, the reflective mirror reduces the space between the two adjacent light-emitting openings to zero, ensuring continuous array of light source and providing a collimating and uniform light source with a high density. This kind of application is suitable for highly directional light source such as the light source for projectors, scanners, professional lightings used on stage and searchlights because it is compact, portable and will not cause overheating.

The reflective surface 134a and the reflective surface 136a can be arranged in many different ways. Nevertheless, to effectively and firmly put together the planar light source using a plurality of point-like light emitting devices, it would be desirable if the reflective surface 134a and the reflective surface 136a are each supplied with the two material layers, 134 and 136. Openings that are predetermined for the conoid-like reflective surface 134a and the conoid-like reflective surface 136a are located on the material layer 134. The light emitting device can be firmly installed on the material layer 134 and it emits light through the opening. Furthermore, the second-stage material layer 136 is placed on top of the first-stage material layer 134 and the openings of the two layers are coupled to each other. In such design, the light emitting devices of different light emitting units are not arranged tightly together. However, a light emitting unit can have as many point-like light emitting devices as necessary.

It should be noted that if the design is based on conoid-like reflective surfaces, the openings of the second-stage conoid-like reflective surfaces 136a must be closely connected to one another since conoids are regular shapes that can fit together perfectly with one another. Hence, non-illuminating regions can be further minimized. This is another effect achieved by the present invention.

The present invention provides an improved planar light source that can be utilized in liquid crystal display projection system. FIG. 5 illustrates the structure of a transmitting-type liquid crystal display projection system, according to an embodiment of the present invention. In FIG. 5, the transmitting-type liquid crystal display projection system uses the planar light source 150 that is described previously. However, the light source consists of a plurality of point-like light emitting devices comprising R/G/B light emitting diodes (LED) 162($r,g,b$). For instance, a more uniform planar light source is achieved through conversion by the second-stage conoid-like reflective surfaces 160a and 160b. R|G/B light emitting diodes (LED) 162($r,g,b$) can simultaneously emit lights to produce a white beam or individually emit lights to produce colored beams in succession. There will be no further description about the light source.

The mechanism of display is described as follows. The transmitting-type liquid crystal display projection system includes a first polarization filter 152, a transmitting-type liquid crystal light valve 154, a second polarization filter 156 and a projection unit 158. Moreover, the light source can be used together with a lens 164, which is not necessary.

First, if the light source is based on the design of R/G/B beams that emit colored lights in succession, the resulting image is accomplished by visual retention. Red, green and blue lights all share the same displaying mechanism. To facilitate the illustration, red light is used in the following explanation. First, red light penetrates through the first polarization filter 152 such as a P-polarization filter. The red light that penetrating through the P-polarization filter will become P-polarized. The P-polarized red light then enters the liquid crystal light valve 154. An example of the liquid crystal light valve is a transmitting-type LCOS panel. Each pixel corresponds accordingly to the requirement of the gray level in order to control the rotation angle of the liquid crystal. Due to the rotation angel of the liquid crystal, the passing P-polarized incident light will tilt. When the value of the gray level is not zero, a portion of the red light will be S-polarized. According to the design of the present invention, the amount of S-polarization will correspond to the requirement of the gray level.

Also, the amount of P-polarization can be used to correspond to the requirement of the gray level.

The following example uses S-polarization corresponding to the requirement of the gray level to illustrate the embodiment of the present invention. A portion of the red light will be S-polarized after penetrating through the liquid crystal light valve 154. As a result, only S-polarized red light will be able to enter the second polarization filter 156 since it is a S-polarized filter. Different pixels will result in different amount of light penetrated through, depending on the corresponding requirement of the gray level needed by each pixel. Therefore, a red light image is achieved. This red light image is projected onto a display plane by the projection unit 158. In this case, it is a display screen.

Similarly, both green light and blue light follow the same mechanism to produce green light image and blue light image respectively. Visual retention allows the images produced by the three colored lights to overlap, resulting in a colored image.

Figure 6:
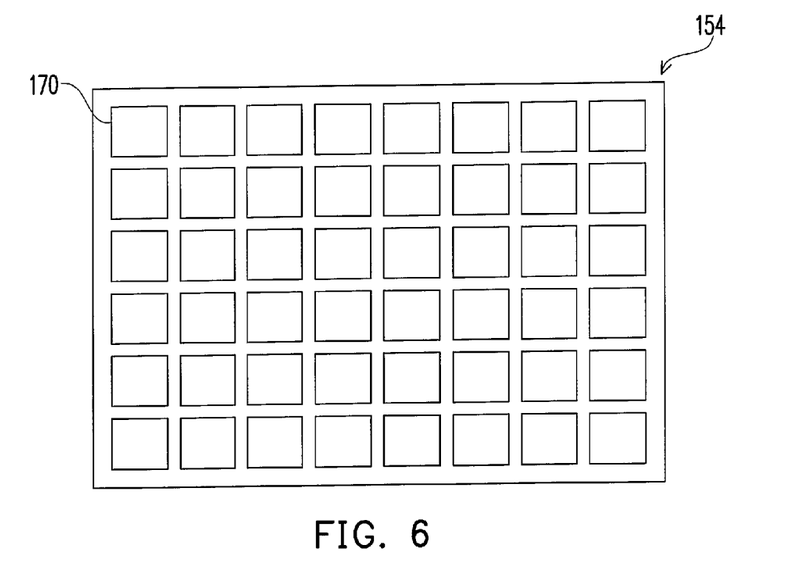
FIG. 6 shows a schematic view that illustrates a distribution of the pixels on the liquid crystal light valve 154.

FIG. 6 shows a schematic view that illustrates the pixel distribution on the liquid crystal light valve 154. In FIG. 6, the liquid crystal light valve 154 contains a plurality of pixels 170 that are shared by R/G/B lights. Therefore, a R/G/B color filter is not needed by the liquid crystal light valve 154.

Figure 7:
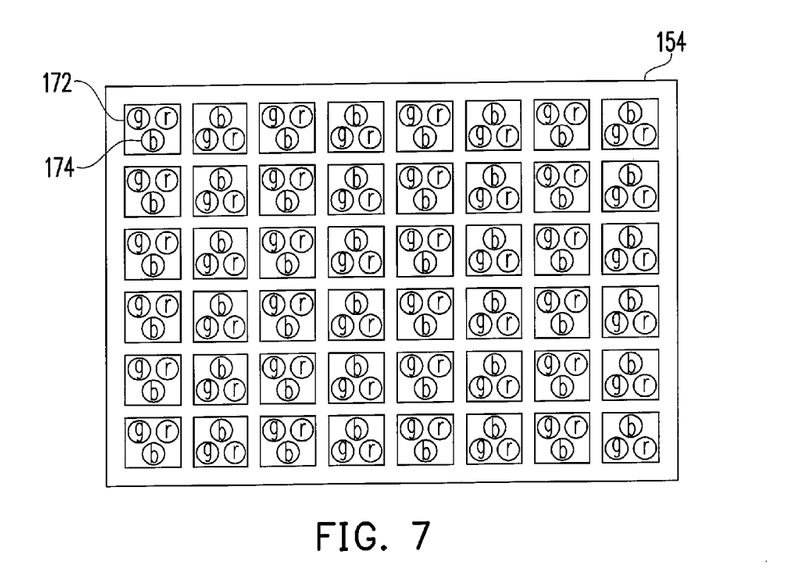
FIG. 7 shows a schematic view that illustrates another distribution of pixels on the liquid crystal light valve 154.

According to another mechanism of the embodiment, if the planar light source 150 gives off white beam, the liquid crystal light valve 154 needs a corresponding R/G/B color filter. FIG. 7 shows a schematic view that illustrates another pixel distribution on the liquid crystal light valve 154. In FIG. 7, a pixel 172 includes three sub-pixels 174($r,g,b$). Each sub-pixel 174 has a corresponding color filter. Hence, each pixel will produce the desired color directly. Here is a schematic view that illustrates the arrangement of the sub-pixels 174. In fact, there can be different combinations of the sub-pixels.

Next, in FIG. 5, the white beam emitted by the planar light source 150 contains both P-polarization and S-polarization. When the white beam penetrates the first polarization filter 152, it will, for instance, become P-polarized. The P-polarized white beam then enters the liquid crystal light valve 154. As illustrated in FIG. 7, each sub-pixel eliminates other color light but its own. Similarly, the gray level required by each sub-pixel controls the rotation angle of the liquid crystal. Due to the rotation angel of the liquid crystal, the passing P-polarized incident light will tilt, resulting in S-polarization. This S-polarized light will then be filtered by the second polarization filter 156, resulting in a colored image light.

Figure 8:
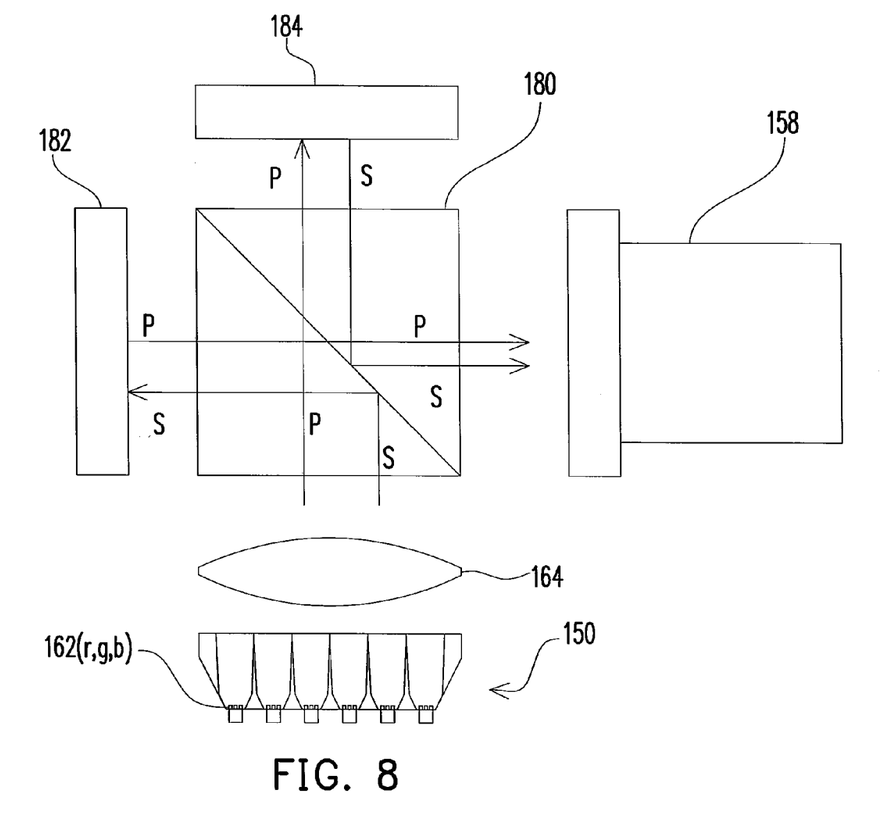
FIG. 8 shows a schematic view that illustrates the structure of a reflective-type liquid crystal display projection system, according to an embodiment of the present invention.

Also, the present invention is not limited to the design of the liquid crystal projection system shown in FIG. 5. FIG. 8 shows a schematic view that illustrates the structure of a reflective-type liquid crystal display projection system, according to an embodiment of the present invention. In FIG. 8, the planar light source 150 as described by the previous embodiment is used as the light source for this liquid crystal projection system.

When needed, the lens 164 can be used to obtain the desired light source. The present embodiment only uses one PBS device 180. In this embodiment, the planar light source 150 produces the three primary color lights, red, green and blue in succession. To facilitate the illustration, red light is used in the following explanation. For instance, the P-polarized red light will penetrate through the PBS device 180 to reach the reflective liquid crystal light valve 184. If the light reaches a reflective LCOS panel, it will be converted to an equivalent amount of S-polarization according to the requirement of gray level. This S-polarization will be reflected to a projection unit 158 by the PBS device 180.

Another way to display is to use the S-polarization generated by the planar light source 150 as the light source for display. The S-polarized red light will be reflected by the PBS device 180 to the reflective liquid crystal light valve 182. Subsequently, according to the requirement of the gray level, an equivalent amount of the S-polarized red light will be converted to P-polarized red light. This P-polarized red light that is reflected to the PBS device 180 can penetrate through the PBS device 180, producing a red image. This is obtained through another light path.

Nonetheless, the aforementioned two methods drastically cause greater losses in the utility efficiency of light. This is because only either S-polarized light or P-polarized light produced by the planar light source 150 is used to generate the image. In other words, generally only 50% of the light produced by the planar light source 150 is used. Although the efficiency of the planar light source 150 in the present invention has been enhanced, it still can be further improved. Therefore, to further improve the efficiency of the planar light source is to optically combine the lights obtained through the two aforesaid light paths to form an image together.

In other words, the PBS device 180 will split the incoming light to the first light beam and the second light beam. In terms of employing the single light path of the single-panel design, such employment facilitates the present invention to use either the reflective liquid crystal light valve 182 or the reflective liquid crystal light valve 184 as the first reflective liquid crystal light valve for receiving S-polarization light beam or P-polarization light beam. Wherein, for easy identification and brief description, the light beam received by the first liquid crystal light valve is denoted as the third light beam. On the other hand, when the employment of dual light path of the dual-panel design is necessary, another one of the reflective liquid crystal light valve 182 and the reflective liquid crystal light valve 184 is used as the second liquid crystal light valve to receive the incoming light, which is known as the fourth light beam. According to the embodiment shown in FIG. 8, a single light path design can employ the corresponding light path provided by either the liquid crystal light valve 182 or the liquid crystal light valve 184 alone. When necessary, the liquid crystal light valve 182 and the liquid crystal light valve 184 are used simultaneously.

Similarly, the same mechanism can be applied to obtain the green light image and the blue light image. Making use of visual retention, red light, green light and blue light are generated using the appropriate frequency to form a true color image. In this embodiment, the liquid crystal light valve 182 and the liquid crystal light valve 184 can be arranged according to FIG. 6 without the installation of a filter.

Additionally, when the planar light source 150 needs to generate a white beam, the polarization mechanism will be similar to the description above and the liquid crystal light valve 182 and the liquid crystal light valve 184 can be arranged according to FIG. 7 to control the value of the gray level of the three primary color sub-pixels and simultaneously form the pixels of the desired color. Certainly, the arrangement shown in FIG. 7 is merely an embodiment of the present invention. The display mechanism thereof is the same as the aforementioned, which will not be further elaborated.

The present invention provides an efficient and highly uniform light source that can be applied in various designs of liquid crystal display projection system to enhance the brightness and the uniformity of images.

The designs shown in FIG. 5 and FIG. 8 are based on the similar principles but each has distinct features of its own. While being less expensive, the transmissive single-panel design shown in FIG. 5 is comparatively more compact than the reflective dual-panel design shown in FIG. 8, thus it has a lower utility efficiency of lights.

In the case where R/G/B lights are emitted successively in an alternating fashion, such design reduces power dissipation and allows easy heat dissipation.

Although the present invention has been disclosed above by the preferred embodiments, they are not intended to limit the present invention. Anybody skilled in the art can make some modifications and alteration without departing from the spirit and the scope of the present invention. Therefore, the protecting range of the present invention falls in the appended claims.

What is claimed is:

1. A liquid crystal display projection system, comprising:
   a planar light source, including a plurality of light emitting units arranged in an array, each light emitting unit comprising:
      a conoid-like reflective surface, wherein an edge of a light outputting surface of the conoid-like reflective surface and that of the adjacent conoid-like reflective surface are conformal; and
      a set of light emitting device controlling the light emission of a planar light source, wherein the planar light source emits either a white beam or cyclically R/G/B light beams in succession;
   a first polarization filter receiving the planar light source and polarizing the same to a first polarization light beam in a first polarization state;
   a transmitting-type liquid crystal light valve receiving the first polarization light beam for converting the first polarization state based on a gray scale to produce a second polarization state having the corresponding gray scale;
   a second polarization filter receiving a light output from the liquid crystal light valve to produce a second polarization light beam in the second polarization state; and
   a projection unit projecting the second polarization light beam onto a display plane.

2. The liquid crystal display projection system of claim 1, wherein the set of the point-like light emitting device of the planar light source comprises three corresponding R/G/B LED's, emitting lights simultaneously to generate the planar white beam or emitting R/G/B beams in succession.

3. The liquid crystal display projection system of claim 1, when the planar light source emits the white beam, each pixel in the liquid crystal light valve has three corresponding R/G/B sub-pixels.

4. The liquid crystal display projection system of claim 1, when the planar light source respectively emit R/G/B beams in sequence, each pixel in the liquid crystal light valve is chronologically shared by the three beams.

5. The liquid crystal display projection system of claim 1, wherein at least one in the set of light emitting device is a white-light LED.

6. The liquid crystal display projection system of claim 1, wherein the conoid-like reflective surface includes:
   an initial-stage conoid-like reflective surface having a convergent opening end and a divergent opening end, wherein the light emitting devices are located at the convergent opening end of the conoid-like reflective surface; and
   a final-stage conoid-like reflective surface having a convergent opening end and a divergent opening end, wherein the convergent opening end of the final-stage conoid-like reflective surface is coupled to the divergent opening end of the initial-stage conoid-like reflective surface.

7. The liquid crystal display projection system of claim 1, wherein the light outputting surface of the conoid-like reflective surface on each light emitting unit is either square or rectangular.

8. A liquid crystal display projection system, comprising:
- a planar light source, including a plurality of light emitting units arranged in an array, wherein each light emitting unit comprising:
  - a conoid-like reflective surface, wherein an edge of a light outputting surface of the conoid-like reflective surface and that of the adjacent conoid-like reflective surface are conformal; and
  - a set of light emitting device controlling the light emission of a planar light source, wherein the planar light source emits either a white beam or cyclically R/G/B beams in succession;
- a PBS device receiving the planar light source, allowing a first light beam in a first polarization state to penetrate through and reflecting a second light beam in a second polarization state;
- a first reflective liquid crystal light valve receiving either the first light beam or the second light beam to serve as a third light beam, and reflecting a first reflection light back to the PBS device, wherein the first liquid crystal light valve transforms a polarization state of the third light beam according to the requirement of gray level, to produce the first reflection light in a first reflective polarization state, then the PBS device splits a first image light from the first reflective polarization state; and
- a projection unit, projecting the first image light onto a display plane.

9. The liquid crystal display projection system of claim 8, wherein the polarization state of the third light beam is P-polarization and the first image light is S-polarization.

10. The liquid crystal display projection system of claim 8, wherein the polarization state of the third light beam is S-polarization and the first image light is P-polarization.

11. The liquid crystal display projection system of claim 8, wherein a second reflective liquid crystal light valve receives another one of the first light beam and the second light beam to serve as a fourth light beam, and reflects a second reflection light back to the PBS device, wherein the second liquid crystal light valve transforms a polarization state of the fourth light beam according to the requirement of gray level, to produce the second reflection light in a second reflective polarization state, then the PBS device splits a second image light from the second reflective polarization state, then the second image light is projected onto the display plane together with the first image light.

12. The liquid crystal display projection system of claim 11, wherein the polarization state of the fourth light beam is P-polarization and the second image light is S-polarization.

13. The liquid crystal display projection system of claim 11, wherein the polarization state of the fourth light beam is S-polarization and the second image light is P-polarization.

14. The liquid crystal display projection system of claim 8, wherein the set of the point-like light emitting device of the planar light source comprises three corresponding R/G/B LED's emitting light simultaneously to generate the planar white beam or emitting R/G/B beams in succession.

15. The liquid crystal display projection system of claim 8, when the planar light source emits the white beam, each pixel in the first liquid crystal light valve comprises three corresponding R/G/B sub-pixels.

16. The liquid crystal display projection system of claim 8, when the planar light source respectively emits R/G/B beams in sequence, each pixel in the first liquid crystal light valve is chronologically shared by the three beams.

17. The liquid crystal display projection system of claim 8, wherein the conoid-like reflective surface comprises:
- an initial-stage conoid-like reflective surface having a convergent opening end and a divergent opening end, wherein the light emitting devices are located at the convergent opening end of the conoid-like reflective surface; and
- a final-stage conoid-like reflective surface having a convergent opening end and a divergent opening end, wherein the convergent opening end of the final-stage conoid-like reflective surface is coupled to the divergent opening end of the initial-stage conoid-like reflective surface.

* * * * *